Figure 1:
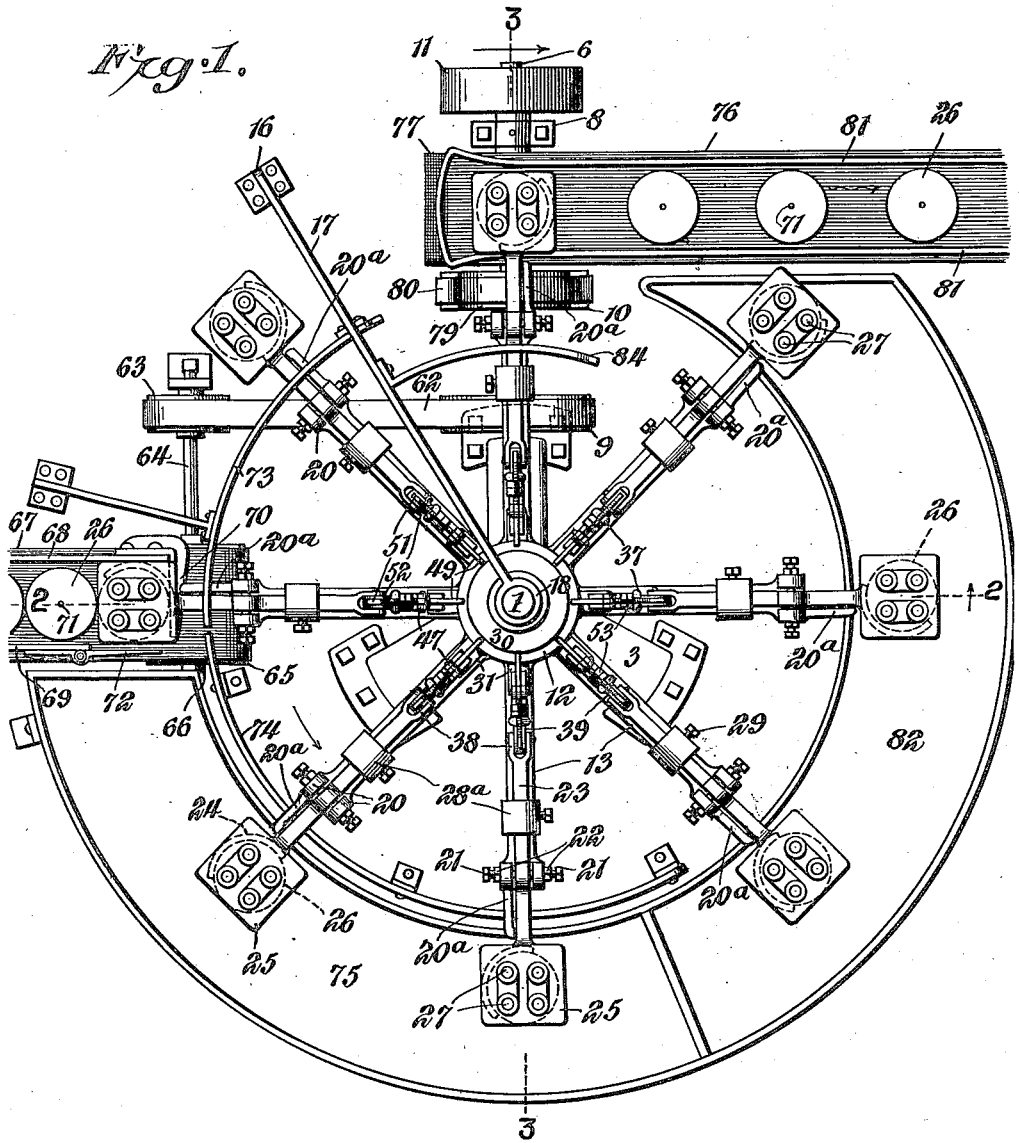

W. J. PHELPS.
AUTOMATIC WEIGHING MACHINE.
APPLICATION FILED MAY 19, 1914.

1,139,070.

Patented May 11, 1915.
4 SHEETS—SHEET 1.

WITNESSES
Howard D. Orr.
H. T. Chapman

Walter J. Phelps, INVENTOR,
BY E. G. Siggers.
ATTORNEY

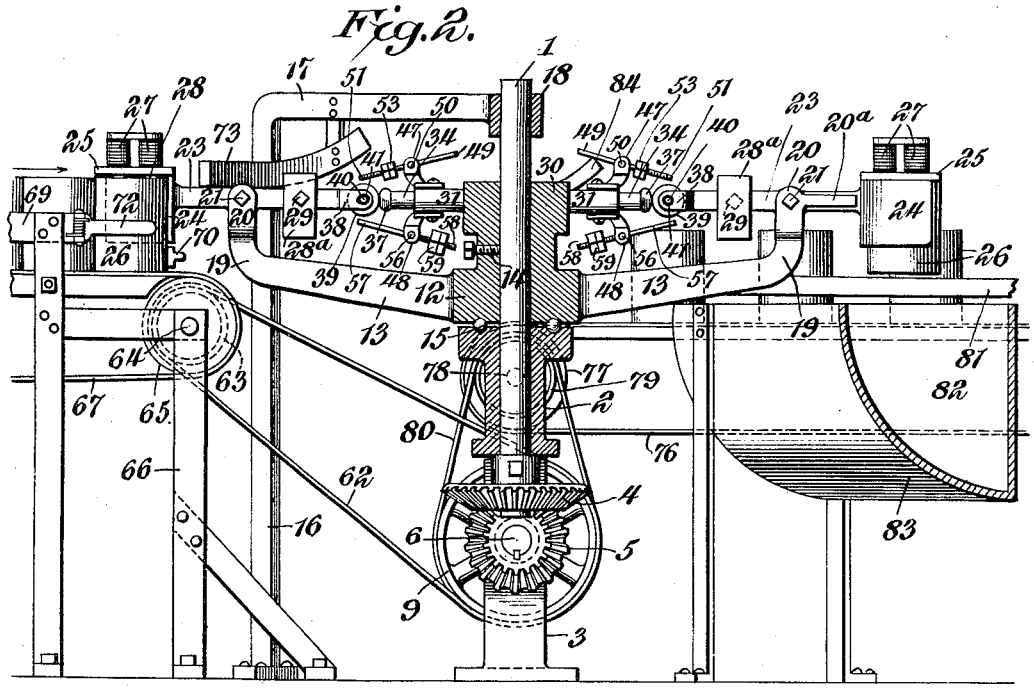

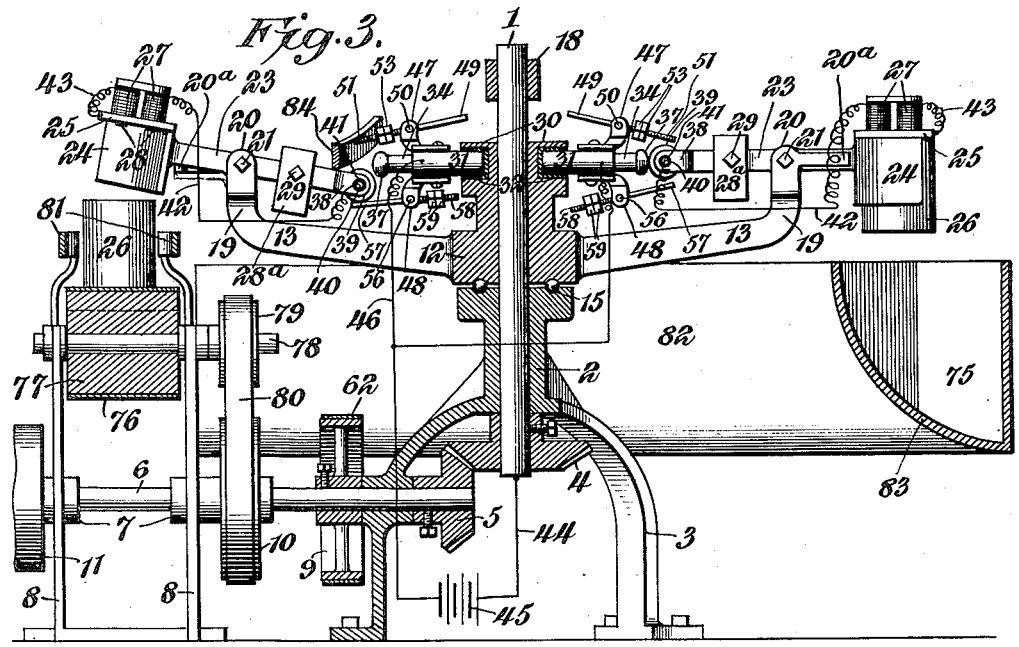
W. J. PHELPS.
AUTOMATIC WEIGHING MACHINE.
APPLICATION FILED MAY 19, 1914.
1,139,070.
Patented May 11, 1915.
4 SHEETS—SHEET 3.
Walter J. Phelps, INVENTOR,
WITNESSES
BY
ATTORNEY

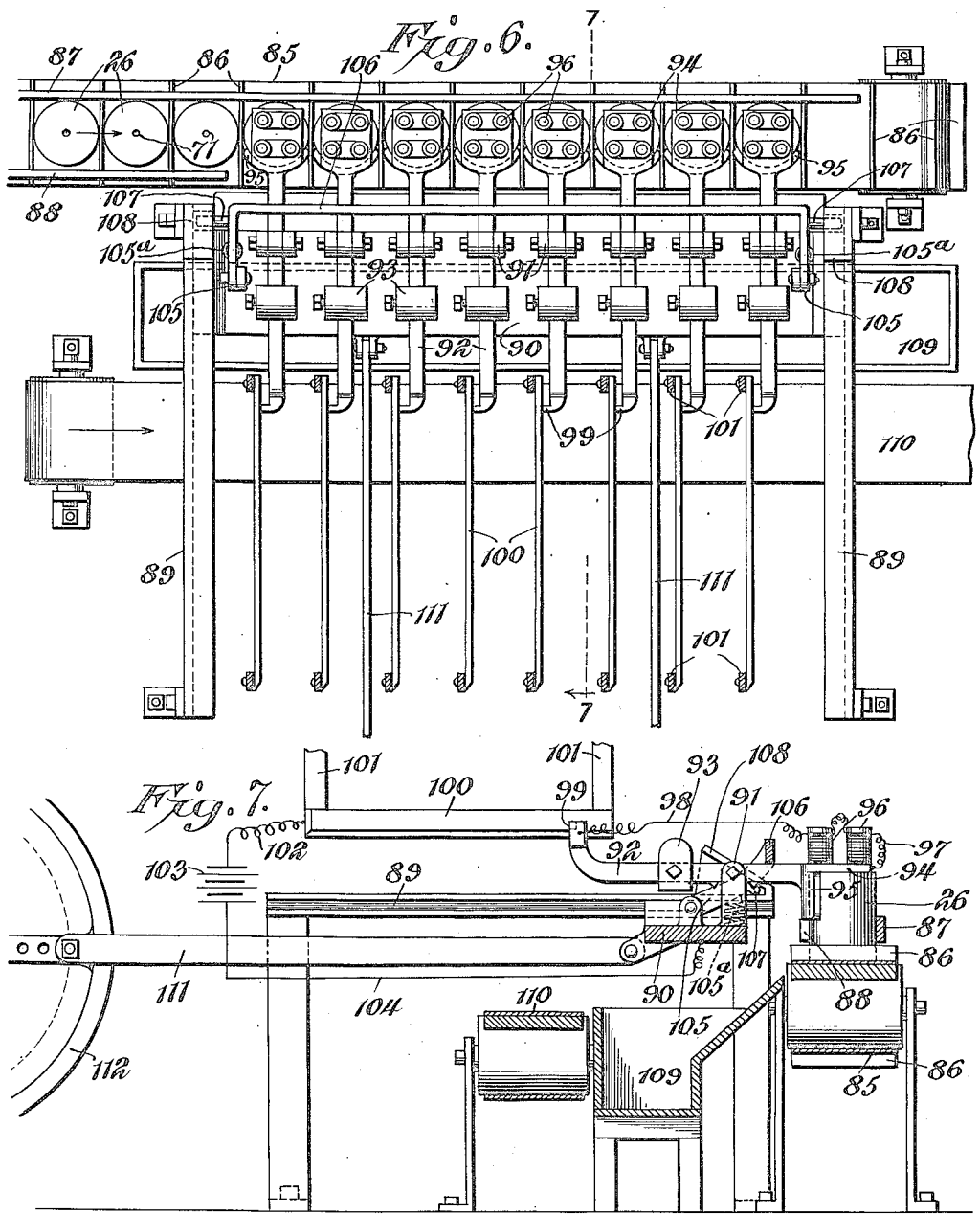

UNITED STATES PATENT OFFICE.

WALTER J. PHELPS, OF BALTIMORE, MARYLAND, ASSIGNOR TO PHELPS CAN COMPANY, OF WEIRTON, WEST VIRGINIA, A CORPORATION OF WEST VIRGINIA.

AUTOMATIC WEIGHING-MACHINE.

1,139,070.     Specification of Letters Patent.     Patented May 11, 1915.

Application filed May 19, 1914. Serial No. 839,595.

*To all whom it may concern:*

Be it known that I, WALTER J. PHELPS, a citizen of the United States residing at Baltimore, State of Maryland, have invented a new and useful Automatic Weighing-Machine, of which the following is a specification.

This invention has reference to improvements in automatic weighing machines, and is designed for weighing packaged commodities where it is desirable to expeditiously weigh the goods in packages and discard all light weight packages, and, if also desirable, all overweight packages.

While the present invention is adaptable to the weighing of various commodities whether in pasteboard cartons or in metal cans, it is particularly intended for use in connection with the packaging of evaporated milk in tin cans. For convenience of description it will hereinafter be considered that the commodity for which the machine of the present invention is employed is evaporated milk in tin cans, but this is done without limiting the use of the invention to such particular commodity or the particular type of container.

In accordance with the present invention the packaged milk is fed to the weighing machine before the cans are sealed, so that in the event of either under or over weight such defect may be remedied by directing the cans again through the filling machine, in which case the underweight cans are supplied with more milk and a proper proportion of the milk within the overweight cans is removed, all this being done within very narrow limits of variation.

Heretofore weighing machines for the like purpose of the present invention have been so constructed that the packages are delivered upon a scale pan or like support, but difficulty is often experienced because of some unevenness of the parts, in which case the packages sometimes catch or jam, and there is a loss of time in remedying the trouble. This objectionable feature is entirely overcome by the present invention by which provision is made for causing an adherence of the then upper ends of the cans or other packages to the scale beam and all underriding supports are avoided and catching and jamming is wholly obviated.

The present invention provides weighing devices so arranged that they may be lowered into engagement with the top of the cans, and devices are associated with the scale beams so that an adherence is caused with the top of each can or package, thereby lifting the package and sustaining it during the weighing operation, provision being made so that if the can and its contents be of a predetermined weight, it will be carried to a suitable point of deposit, but if the can and its contents be of underweight or overweight the arrangement is such that the movement of the weighing devices caused by such underweight or overweight causes the release of the can and its deposition at some other point.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of a weighing machine designed more particularly for evaporated milk packaged in metal cans. Fig. 2 is a section on the line 2—2 of Fig. 1. Fig. 3 is a section on the line 3—3 of Fig. 1. Fig. 4 is a longitudinal section of one of the weighing devices drawn on a larger scale than in the other figures. Fig. 5 is a section on the line 5—5 of Fig. 4. Fig. 6 is a plan view of a modification of the weighing machine. Fig. 7 is a section on the line 7—7 of Fig. 6. Fig. 8 is a view of a weighing element or device with some parts in elevation and some parts in section, and also showing some neighboring parts, the weighing device being of a modified construction, and while adapted for cans of milk, is also adapted for other types of packaged commodities.

The present invention is particularly adapted as an adjunct to a can filling machine, such as shown and described in Letters Patent No. 1,059,097, granted to me on April 8, 1913, although, of course, the invention is of wider applicability.

Referring first to the structure shown in Figs. 1 to 5 inclusive, there is provided an upright shaft 1 mounted in a bearing 2 sustained by an arch pedestal 3. The shaft 1 extends below the bearing 2, and there has secured to it a bevel gear 4 meshing with another bevel gear 5 on a power shaft 6 having bearings 7 in uprights 8. On the power shaft are pulleys 9, 10 and 11 to which reference will hereinafter be made. On the shaft 1 above the bearing 2 is a hub 12 from which radiate arms 13, the hub and arms constituting a rotatable spider. The hub 12 is made fast to the shaft 1 by any suitable means, such as one or more set screws 14 and friction is largely reduced by the introduction of anti-friction bearings which may take the form of balls 15 in suitable race-ways in the adjacent ends of the bearing 2 and hub 12. In order to steady the upper end of the shaft 1 and to support certain structures, there is provided a post 16 at an appropriate distance from the pedestal 3 and provided with an overhung arm 17 terminating in a bearing 18 for the upper end of the shaft 1. The spider comprises a suitable number of arms 13 arranged in circular series, the particular showing of Fig. 1 illustrating eight of such arms, but it will be understood that the number of arms will depend upon the desired capacity of the machine. These arms 13 are designed to carry certain weighing mechanism, and as the weighing mechanism on each arm is like that of all the other arms, a description of one weighing mechanism will apply to all. In the particular construction shown each spider arm 13 has an upturned end 19 terminating in spaced ears 20 through each of which is threaded a pointed screw 21, (see Fig. 5), each screw being provided with a lock nut 22. Mounted between the pointed screws 21 is a scale beam or lever 23, one arm of which projects in a direction away from the hub 12 and terminates in a shield 24 which may be approximately quadrantal and is curved about an axis substantially perpendicular to the length of the lever arm. That end of the shield which in operative position constitutes the upper end is formed with a cap or cover member 25 shown as approximately square, but this cover member may be of any appropriate shape, and is usually made of sufficient size to about cover the end of a can, such as indicated at 26. Such a can may be assumed to be a tin can of appropriate size already filled with evaporated milk by the machine of the aforesaid Letters Patent, or the can may be considered as any appropriate type of can containing any desired commodity, but for use with the weighing machine of Fig. 1 and associated figures this can must have sufficient magnetic material present to operate with the machine of Fig. 1 where magnetic attraction is depended upon for suspending the can, as will presently appear.

The entire scale beam or lever 23 is preferably made of some suitable metal which need not be magnetic, and which by preference is a metal that will not readily corrode or rust under the exigencies of use, brass or bronze, or even aluminum serving the purpose.

Mounted on the head 25 are electromagnets 27 having polar extremities 28 extending through the cap or top 25, so that these polar extremities may be brought into close relation to the cans 26 in a manner to be described, and then on the energization of the magnets the cans are attracted so vigorously as to be suspended from the magnets against any danger of dislodgment therefrom under the shocks and jars incident to the operation of the machine. Practice has demonstrated that there is an ample amount of iron or steel in the tin plate employed in the manufacture of tin cans to provide for the sustaining of filled cans by their upper ends when engaged by the magnets 27, and the latter are properly energized.

Mounted on that arm of the weighing beam or lever 23 remote from the head 25 is a weighing poise 28 movable along the beam to any desired point, and this poise is provided, as is customary, with a set screw 29 by means of which it may be fixedly held at the desired point along the scale beam arm to not only counterbalance the other end of the scale beam with the magnets thereon, but a filled can 26 containing the proper amount of milk or other commodity.

The hub 12 is provided with a circular radial rib 30, and mounted therein is a circular series of cylindrical shells or tubes 31 each separated from the rib by a cup 32 of electrical insulating material. Of course, the shells or tubes 31 need not be cylindrical, but such form is convenient for the purpose. Each shell or tube 31 at the outer end is thickened as shown at 33 to reduce its internal diameter and slidably mounted in the thickened portion 33 is a plunger 34 laterally enlarged at the inner end as shown at 35 to approximately the internal diameter of the tube 31, and between this thickened end 35 and the cup 32 there is lodged a spring 36 tending at all times to project the plunger 34. At the outer end the plunger 34 is provided with a knob 37 suitably rounded for a purpose which will presently appear.

The end of the scale beam 23 toward the hub 12 is bifurcated, as shown at 38, and in this bifurcated end there is mounted a roller 39 having a spindle 40 separated from the metal of the scale beam by insulating material 41, so that there is no direct electric contact between the scale beam and the roller.

One side of the windings of each magnet 27 is connected by a conductor 42 to the roller 39, this connection being conveniently through the spindle 40, while the other side of the windings of the magnet is grounded by a conductor 43 through the metal of the scale beam, and from thence to some part of the machine. At some other part of the frame of the machine there is connected a conductor 44 which may be coupled to a source of electric current conventionally represented as a battery 45, but which may be any other suitable source, and from this battery 45 there is carried a conductor 46 to the tube or shell 31, so that when the roller 39 is in contact with a knob 37 there is established a circuit from the battery 45 through the frame of the machine to the windings of the magnet 27, thence by the conductor 42 to the roller 39, thence to the knob 37 and to the shell 31, returning to the battery by way of the conductor 46. A single battery of course serves for all of the magnets.

For certain purposes which will hereinafter appear the shell or tube 31 has fast thereto brackets 47, 48, respectively, the bracket 47 rising from the upper side of the tube and the bracket 48 depending from the lower side thereof. Mounted in the bracket 47 is a rod 49 arranged to swing on a horizontally disposed pin 50, and this rod is of a length to have an end 51 in the path of the roller 39 on a rising movement of the roller. The end 51 of the rod 49 is threaded as shown at 52 and the threaded portion carries nuts 53 acting as interlocking poises. A nose 54 on the rod 49, and a stop 55 on the bracket 47 serve to limit the movement of the end 51 of the rod 49 toward the roller 39.

Mounted to rock on a pin 56 carried by the bracket 48 is a rod 57 having one end in the path of the roller 39 on its downward movements below a horizontal or balanced position of the scale beam 23. The rod 57 has an end 58 remote from the end in the path of the roller 39 threaded and provided with locking nuts 59 serving as interlocking poises like the poises 53. The rod 57 like the rod 49 has a stop nose 60 in coactive relation to a stop 61 on the bracket 48, so that when the scale beam 23 is in the horizontal position the roller 39 does not contact with the corresponding end of the rod 57.

Extending from the pulley 9 is a belt 62 engaging a pulley 63 on a shaft 64 carrying a drum 65, the shaft 64 being mounted upon a suitable supporting frame 66. The drum 65 carries one end of an endless conveyer 67 upon which the cans 26 are deposited, either directly from the filling machine of the aforesaid Letters Patent or from any other source. In order to maintain the cans upon the conveyer 67, guide strips 68, 69 are provided, and at the end of the conveyer adjacent to the weighing mechanism there is a stop member 70 whereby the travel of the cans is arrested at the appropriate point, the conveyer belt slipping under those cans the travel of which is stopped. When the cans are passing through the filling machine they are in the inverted position; that is, with the filling opening downward, but on leaving the filling machine the cans are reinverted so that the filling opening is uppermost and in the drawings this opening is indicated at 71.

The conveyer 67 is so related to the shaft 1 that the heads 25 are carried over the cans in engagement with the stop 70 in close relation to these cans, and in a manner to bring the shield 24 into side engagement with the can so as to sweep it laterally off of the conveyer, the guide 69 terminating in a spring-actuated gate 72 in the path of the can swept off of the conveyer, so as to offer no impediment to such movement, the gate snapping back to its original position after being disturbed.

Since the poise 28ᵃ is arranged to balance the scale beam when carrying a properly filled can, it normally overbalances the scale beam and consequently the scale beam has a normal tendency to move to a position raising the can engaging end thereof. In order to bring the can engaging end of the empty scale beam into suitable relation to the can, a cam strip 73 is carried by the arm 17 and is shaped to override the outer ends of the scale beams as they approach the conveyer 67, so that when a can is engaged by the shield 24 the polar extremities 28 of the magnets 27 are in close relation to the then upper head of the can. When the scale beams are empty and overbalanced by the poises 28 the rollers 39 are below the knobs 37 to an extent causing a rupture of the circuit, and the magnets 27 are therefore deenergized. When, however, the scale beams are engaged by the cam strip 73 and their outer ends are depressed, the rollers 39 are moved into engagement with the knobs 37 and the electric circuit is completed, thus energizing the magnets 27, so that when the cans are reached, the magnets are active and the cans are attracted, being slightly lifted to an extent raising them from the conveyer, so that there is no sliding friction offered to the movement of the cans laterally away from the conveyer. As soon as the scale beams carrying the cans have moved away from the conveyer they are brought into overriding relation to a supporting strip 74 of appropriate length, and extending from the side of the conveyer 67 from which the cans are removed to a point close to the other end of the strip 74 is a trough 75 over which the cans suspended by the magnets are carried. This trough 75 may have an extent of about one-third the full circle of travel of the scale beams, but any particular length of trough is not obligatory. It should be long enough however to permit the scale beams to reach the desired balance. At another point in the travel of the scale beams their outer ends are brought over another conveyer 76 similar to the conveyer 67. The conveyer 76 is supported at what constitutes the receiving end by a roller 77 mounted on a shaft 78 journaled in the upper ends of the standards 8 and the shaft 78 is provided with a pulley 79 connected by a belt 80 to the pulley 10. The conveyer 76 is flanked by guide rails or strips 81 and is extended to any appropriate point of disposition of the cans. Extending from the end of the trough 75 remote from the conveyer 67 to a point adjacent to the conveyer 76 is another trough 82. Both troughs may have one side rounded, as indicated at 83 in Fig. 3, so that should cans be released from the suspending means they will drop into either trough without sudden shock or jar, such being relieved by the gradual inclination of the sides of the troughs. The sustaining bar 75 is only continued to about the commencement of the trough 82 and there stops.

Carried by the arm 17 is another cam bar 84 in position to engage and rock the roller ends of the scale beams in a downward direction just after they have been brought over the conveyer 76 and before they leave said conveyer, the rocking being sufficient to break the circuit of the magnets 27, thus deënergizing them and releasing the cans, so that they gravitate upon the conveyer 76, and as the latter is continuously moving each can dropped is carried out of the way of the next can before it is in position to drop upon the conveyer. Let it be assumed that filled cans 26 are being supplied to the conveyer 67 in regular order, and that they reach the stop 70 each before a scale beam is brought into operative relation to the conveyer 67. As the action of all the scale beams is the same the journey of but one will be followed. As the scale beam approaches the conveyer 67 it is engaged by the cam strip 73 near the outer end of the beam and the electromagnetic can engaging devices are depressed, so that a can in engagement with the stop 70 is in the path of the electromagnetic can-engaging devices in such manner that as soon as the magnets come over the can the latter is lifted into engagement with the magnets from contact with the conveyer. This movement need be but short and the magnetic field is amply strong for the purpose. Now the can is firmly attached at its upper end to the scale beam and is in suspended or pendent relation thereto and begins its journey over the trough 75 toward the conveyer 76. Let it be assumed that the correct amount of milk is within the can. The scale beam is brought to balance by the weight of the filled can in such position that the contact between the roller 39 and the knob 37 is maintained, and it may be further assumed that the roller 39 is situated about midway between the top and bottom of the knob. This being the case, the magnets remain energized and consequently the can is carried over the trough 75 and from thence over the trough 82, and finally the cam bar 84 is reached. This bar causes a depression of the contact end of the scale beam and a raising of the other end and the movement is sufficient to carry the roller 39 out of engagement with the knob 37 whereupon the electric circuit is broken, the magnets become deënergized, and the can thus released gravitates to the conveyer 76 for transportation to some suitable point of disposal. So long as the cans have been suitably filled the procedure just described continues without interruption. Suppose, however, that the can engaged by a scale beam shall be deficient in the quantity of milk, so as to be a light weight can. Such a can is overbalanced by the poise 28 and as soon as the scale beam escapes from the cam strip 73 the end of the scale beam carrying the can is elevated sufficiently to cause the roller 39 to leave the knob 37, thus breaking the circuit and releasing the can, which thereupon drops into the trough 75, the length of the trough being sufficient to permit the adjustment of the scale beam to cause a breakage of the circuit while the can is still over the trough 75. Suppose, again, that the can is considerably over weight. Under these circumstances the can carrying end of the scale beam is lowered by the over weight can, but this lowering is not sufficient to carry the roller 39 away from the knob 37 so long as the can is over the trough 75, since any such lowering movement of the can sustaining end of the scale beam is prevented by the supporting bar 74, upon which the can carrying end of the scale beam rides so long as it is moving over the trough 75. As soon however as the end of the bar 74 is reached the heavy can overbalances the counterpoise 28, thus causing a lowering movement of the can sustaining end of the scale beam until the roller 39 leaves the knob 37, thereby breaking the circuit and deënergizing the magnet and permitting the can to fall into the trough 82.

Thus the device will select between proper weight cans, light weight cans, and overweight cans, so that the packer has assurance that all cans reaching the conveyer 76 are of correct weight. The discarded cans, whether of light weight or over weight, are removed from time to time from the troughs 75 and 82 and returned to the filling machine to pass through the latter to either receive an additional amount of milk or to have the surplus extracted, this being feasible with the filling machine shown and described in the aforesaid Letters Patent, and also because of the character of the can employed with its extremely small filling perforation permitting the cans to be handled either right side up or up-side-down without liability of escape of the milk therein.

Because of the penalties which may follow from even a relatively few light weight cans, it is worth while to test all of the cans for under weight, so that all light weight cans are discarded to be subsequently brought to full weight, which may be readily accomplished by the filling machine of the aforesaid Letters Patent, the cans being weighed before sealing. While for economical reasons it may be advisable to discard over weight cans for further treatment to remove surplus milk, this step may, if desired, be omitted.

It may be advisable under some circumstances to establish a minimum margin of light weight and also a minimum margin of over weight. For instance, it may be permissible under some circumstances to retain cans where they only vary by a small fraction of a unit of weight on either side of the correct weight. The cans being tested may be designed to contain one pound of milk each, and it may be found desirable to retain all cans which vary but slightly on either side of this weight, say, by one-eighth of an ounce, so that the average of the cans passed by the machine as correct in weight will average up very close to the correct amount, and so close as to satisfy the demand of contract specifications without the necessity of the packer overfilling the cans. Such adjustment of the weighing mechanism as to set the maximum and minimum margins is brought about by the employment of the rods 49 and 57. These rods with their respective poises 53 and 59 are properly adjusted and are so arranged as to be in the path of the roller 39 on each side of its swing with respect to the knob 37. If the can be under a predetermined weight, then the roller 39 lowers under the action of the poise 28 until it engages the rod 57, and its further movement is arrested to the extent of the resistance of the rod due to the added counterpoise effect upon the scale beam, and this counterpoise effect may represent, say, an eighth of an ounce. If the can be over weight it will swing the scale beam in the other direction to be arrested by the rod 49 in like manner, and to a like extent, if desired. The counterpoise rods 49 and 57 also act as retarders preventing overriding of the scale beam should it be balanced by a can of proper weight, and, therefore, sensitive to swinging movements which might cause the scale beam to discard as either over or under weight a can which actually is of proper weight. The resistance offered by the counterpoise weights or devices is sufficient to overcome such excessive oscillation of the scale beam, but adds so little to the margin of under weight or over weight that it is quite safe to pass a can approaching the proper weight so nearly as an eighth of an ounce. Of course, the margins may be set as the packer may determine but experience has shown that the device illustrated and described is particularly sensitive and reliable for the purposes intended.

In the structure shown in Fig. 1 and associated figures the cans are removed from the feeding conveyer one at a time and deposited upon the second conveyer one at a time. It is quite feasible to weigh a group of cans at one time, and an apparatus is shown in Figs. 6 and 7 for this purpose.

There is a conveyer 85 which may be provided with slats 86 by means of which the cans 26 are maintained separated in properly spaced relation. The conveyer 85 is provided with side guides 87, 88, the guide 87 being considerably longer than the guide 88.

At the delivery end of the conveyer 85 are guide tracks 89 spaced apart lengthwise of the conveyer 85 and extending laterally therefrom. Mounted in these tracks is a slidable gate 90 upon which are erected a series of posts 91 each carrying a scale beam 92 which in a general way corresponds to the scale beam 23 of the structure of Fig. 1, and associated figures. The scale beam 92 is provided with a poise 93, a head 94 and a shield 95, the latter corresponding to the shields 24, but differently related to the scale beams, since the latter approach the cans in a different direction than in the structure of Fig. 1. Mounted on the head 94 is an electromagnet 96 having its coils connected on one side by a conductor 97 to the body of the machine, and on the other side by a conductor 98 to a contact 99 on and insulated from the end of the scale beam remote from the magnet. Each contact 99 is in position to engage and move along an elongated contact bar 100 supported by hangers 101 or otherwise from appropriate parts of the framework of the machine, or from other supports. Each bar 100 is connected by a conductor 102 to a current source represented in Fig. 7 as a battery 103, while the other side of the battery is connected by a conductor 104 to the bed plate 90 or some other part of the machine electrically connected to the head 94.

Pivotally mounted on the bed plate 90 near the ends thereof are arms 105 at the ends of a bar 106 extending lengthwise of the bed plate in overriding relation to the can engaging ends of the scale beams. The arms 105 are underridden by springs 105ᵃ tending constantly to elevate them. The arms 105 are each provided with a pin 107 movable with the bed plate into underriding relation to a respective cam member 108 which may be mounted on those ends of the tracks 89 adjacent to the conveyer 85. The bed 90 moves transversely of the conveyer 85 toward and from the latter and in underriding relation to this bed plate adjacent to the conveyer 85 and on the same side of the conveyer as the bed plate is a trough 109, while on the side of the trough 109 remote from the conveyer 85 is another conveyer 110. The bed plate 90 is reciprocated by links 111 driven by a crank disk 112, or in any other manner.

The conveyer 85 is supposed to be continuously traveling in a suitable direction, say, toward the right as viewed in Fig. 6 and as indicated by the arrow at the left hand end of Fig. 6. Assuming that the parts are all properly timed in operation the battery of scale beams, shown as eight in number, but by no means limited to such particular number, is advanced by the bed plate 90 into engagement with a corresponding number of cans then in their path, and the magnets being simultaneously energized the can engaging ends of the scale beams are brought by the action of the cams 108 on the pins 107 and the bar 106 controlled by the pins, into active relation to the cans to magnetically grip the cans at their upper ends. The bed 90 is at once withdrawn carrying the group of cans engaged by the scale beams with it, these cans at once rising if of light weight, but no provision is made for lowering the cans sufficiently to break the circuit if they be of heavy weight.

So long as the cans are of proper weight the contacts 99 remain in engagement with the elongated contacts 100 until the cans are over the conveyer 110 at which point the contacts 99 run off from the contacts 100 and the magnets are deënergized, so that the cans drop on to the conveyer 110 to be carried to some point of disposal. If any of the cans be under weight the scale beams at the can supporting ends rise, thus carrying the contacts 99 below the contacts 100, thereby breaking the circuit while the cans are still over the trough 109, and the cans are released to drop into the latter. In the structure of Figs. 6 and 7 the cans are weighed simultaneously in groups and one or more light weight cans if present are discarded. The operation of the device in Figs. 6 and 7 is so timed that a group of cans is removed from the conveyer 85 and deposited either in the trough 109 or conveyer 110 and the scale beams are returned into operative relation to the conveyer 85 during the time it takes to move the conveyer with cans thereon to an extent corresponding to the length of the group of cans removed therefrom.

The electromagnetic means for suspending the packages is only available where magnetic material is present in the packages either in the container itself or in the contents of the container. In the case of packaged cereals or other like commodities where no magnetic material is present some other force than magnetism must be employed for suspending the packages.

In Fig. 8 there is shown means whereby packages may be weighed whether or not the containers be made of magnetic material or the contents of the containers be of magnetic material.

In Fig. 8 only so much of the apparatus is shown as is deemed necessary for an understanding of this particular phase of the invention, it being understood that in the complete machine many of the features shown and described with reference to the other forms may be embodied.

In the particular structure illustrated in Fig. 8 there is a shaft 113 which may correspond to the shaft 1 of Fig. 1, and this shaft has a central passage 114 either throughout the length of the shaft or for an appropriate portion of such length. Applied to the shaft is a hub 115 having arms 116 radiating therefrom, the arms being in general similar to the arms 13 of Fig. 1 and associated figures. The hub 115 is made fast to the shaft 113 by a set screw 117 or otherwise, and within the hub there is formed an annular chamber 118 communicating with the interior 114 of the shaft 113 by passages 119 formed in the walls of said shaft.

Adjacent to each arm 116 there is a nipple 120 formed on the hub 115 and provided with a through passage 121 opening into the chamber 118. Each nipple 120 receives one end of a hose or pipe 122 having a purpose to be described.

The arm 116 carries a scale beam 123 on the outer end of which there is formed a hollow cylindrical enlargement 124 inclosing a chamber 125, heads 126 and 127, respectively, being applied to the opposite ends of the enlargement 124. A finger 128 projects from the outer side of the enlargement 124 to receive a depressing cam 129 similar to the cam 73 of Fig. 1 and associated figures.

The head 126 is connected in an air tight manner to the corresponding end of the cylinder 124 and is formed with a through passage 130 surrounded by a rib constituting a valve seat 131 to which is applied a valve 132 on one end of a valve lever 133 carried by a bracket 134 erected on the head 126. The other end of the valve lever 133 is provided with an armature 135 within the influence of an electromagnet 136 carried by the scale beam 123. One side of the magnet 136 is connected by a conductor 137 with the scale beam, and the other side by a conductor 138 to a contact finger 139 on but insulated from the end of the scale beam remote from the cylinder 124. A stop member 140 carried by the scale beam and adjacent to the arm 116 limits the movements of the scale beam in one direction. On the other side of the arm 116 from the stop 140 the scale beam has a poise 141 thereon held in adjusted positions by a set screw 142.

Fast on the shaft 113 is a collar 143 suitably insulated therefrom and provided with contact fingers 144 each in the path of a respective contact finger 139. The collar 143 is connected by a conductor 145 to a battery 146 as representative of any suitable source of current, and the latter is connected by a conductor 147 to some portion of the framework of the machine in electrical connection with the conductor 137.

Each head or cylinder 124 is formed with a nipple 148 for the reception of that end of the pipe 122 remote from the nipple 121 to which it is connected, so that the chamber 118 is in constant communication with the chamber 125. The head 127 is formed with a passage therethrough surrounded by a flange 149 carrying a gasket 150 of some such material as soft rubber.

The connection of the hub 115 with the shaft 113 is rendered air tight by set collars 151 between which and the hub are interposed packing rings 152.

A conveyer 153 delivers packages 154 of suitable commodities into the path of the gaskets 150 similarly to the delivery of cans 26 to the electromagnetic picking-up heads of Fig. 1 and associated figures, and the packages 154 may be replaced by cans of milk such as the cans 26.

It is assumed in the showing of Fig. 8 that a suitable number of arms 116 and scale beams 123 are provided and that rotative movement is imparted to the shaft 113 with the conveyer 153 feeding cans into position to be lifted therefrom. Suction is continuously maintained through the shaft 113 by any suitable means, so that air is continuously being withdrawn from the chambers 125 through the pipes 122, the suction being sufficient to maintain a suitable degree of subatmospheric pressure within each chamber 125, especially when its gasket 150 is in engagement with the upper head of a container 154. As the scale beams are brought into engagement with the cam bar 129 they are depressed sufficiently to force the gasket 150 against the upper head of a container 154, whereupon the subatmospheric conditions within the chamber 125 are made more pronounced because of the sealing of the gasket 150 against the head of the container, and a continued rotative movement of the shaft 113 causes a lateral carrying away of the engaged container from the conveyer 153, which latter may have stop and guide means similar to the showing of Fig. 1 and associated figures, but which have been omitted from the showing of Fig. 8. As soon as the scale beam with the container suspended therefrom has passed from the region of the conveyer the scale beam will be balanced and remain balanced if the container and its contents be of proper weight. If they be of over weight the scale beam will simply tip until the stop 140 arrests further movement thereof. If, however, the container and its contents be of light weight, then the poise 141 overbalances the suspended package and the contact finger 139 is brought into engagement with the contact finger 144 in its path, thus establishing an electric circuit from the battery 146 through the conductor 147 and the frame of the machine to the conductor 137, and from thence to the magnet 136, returning to the battery by way of the conductor 138, fingers 139 and 144, and conductor 145. The magnet being energized attracts the armature 135, thus rocking the lever 133 in a direction to remove the valve 132 from the valve seat 131, whereupon air passes into the chamber 125 through the passage 130, thus so relieving the subatmospheric conditions within the chamber 125 that the difference between such conditions and the atmosphere is no longer able to sustain the weight of the container and the latter drops to be received into a suitable receptacle or otherwise. When the packages are of proper weight they may be discharged from the holding devices on the scale beams by any suitable arrangement causing a closure of the electric circuit and the energization of the magnets 136.

In the structure of Fig. 1 and associated figures power is assumed to be applied to the pulley 11, and from the shaft 6 driven by this pulley power is distributed to the various moving parts of the machine.

In order to avoid any strain upon the scale beams should for any reason the can offer resistance to removal from the feeding conveyer, each arm 13 may be provided with an extension 20ª of one of the ears 20 on what constitutes the rear side of the arm with respect to its direction of travel. The extension 20ª is carried close to the can engaging end of the scale beam, and only a slight clearance is provided, so that should there occur a resistance which would tend to swing the scale beam sidewise such sidewise movement will be so slight before it is stopped as to avoid any injury to the scale beam. The only clearance needed is that which will prevent any rubbing of the parts and consequent interference with the delicacy of movement of the scale beam.

What is claimed is:—

1. In a machine for weighing articles, weighing means, and means associated therewith for causing the articles to adhere to and be suspended by the weighing means at the top portions of said articles while being weighed, said second-named means including means for causing the release of the suspended articles under predetermined weight conditions.

2. In a machine for weighing articles, weighing means, means associated therewith for causing the articles to adhere to and be suspended from the weighing means while being weighed, and means responsive to predetermined weight conditions for releasing the articles from the suspending means.

3. In a machine for weighing articles, weighing means, means associated therewith for causing the articles to adhere to and be suspended from the weighing means while being weighed, and means responsive to the action of articles weighing less than the predetermined weight for releasing the articles from the suspending means.

4. In a machine for weighing articles, weighing means, means associated therewith for causing the articles to adhere in suspended relation to the weighing means while being weighed, and means responsive to weights both less and greater than a predetermined weight for releasing the articles from the suspending means.

5. In a machine for weighing articles, weighing means, means associated therewith for causing the articles to adhere in suspended relation to the weighing means while being weighed, and means responsive to weights both less and greater than a predetermined weight for releasing the articles from the suspending means, said weight responsive means being arranged to act in the order named.

6. In a machine for weighing articles, weighing means, means associated therewith for causing the articles to adhere in suspended relation to the weighing means while being weighed, means for causing the weighing means to traverse different zones, means responsive to weights under a predetermined weight for causing the release of under weight articles while traveling through one zone, means responsive to over weight articles for causing their release while traveling through another zone, and means for rendering the second-named weight-responsive releasing means inactive while traveling through the light weight zone.

7. In a machine for weighing articles, weighing means, means associated therewith for causing the articles to adhere in suspended relation to the weighing means while being weighed, means for causing the weighing means to traverse different zones, means responsive to weights under a predetermined weight for causing the release of under weight articles while traveling through one zone, means responsive to over weight articles for causing their release while traveling through another zone, and means for rendering the second-named weight-responsive releasing means inactive while traveling through the light weight zone, the machine being also provided with means for releasing articles retained thereby after passing the second-named zone.

8. In a machine for weighing articles and discarding those of less than a predetermined weight, weighing means, article engaging means on the weighing means constructed and adapted to cause the articles to adhere to the weighing means in suspended relation thereto, and means responsive to movements of the weighing means due to light weight articles to cause the release of the latter.

9. In a machine for weighing articles and discarding those either lighter or heavier than a predetermined weight, weighing means, article engaging means on the weighing means constructed and adapted to cause the articles to adhere to the weighing means in suspended relation thereto, means responsive to movements of the weighing means due to a light weight article to cause the release of the latter, and means responsive to movements of the weighing means due to a heavy weight article to cause the release of the latter.

10. In a machine for weighing articles and discarding those either lighter or heavier than a predetermined weight, weighing means, articles engaging means on the weighing means constructed and adapted to cause the articles to adhere to the weighing means in suspended relation thereto, means responsive to movements of the weighing means due to a light weight article to cause the release of the latter, and means responsive to movements of the weighing means due to a heavy weight article to cause the release of the latter, said machine having means for preventing the active operation of the over weight responsive means until a later period in the operation of the machine than that during which the lighter weight means is active.

11. In a machine for weighing articles, a series of weighing devices, means for causing the adhering of the articles to the weighing devices in suspended relation thereto, and means for maintaining the suspending means active for articles of a predetermined weight and for discarding those of other weights.

12. In a weighing machine, a rotatable series of weighing devices, means on each weighing device for causing the adhering of the articles to be weighed in suspended relation thereto, means for maintaining the suspending means active to articles of a predetermined weight from the point of engagement to a predetermined point of discharge, and means for discarding articles of other weights between the point of engagement therewith and the predetermined point of discharge of articles of predetermined weight.

13. In a weighing machine, a rotatable series of successively active weighing devices each provided with means for causing the adhering of the articles to be weighed in order to the weighing devices, means for maintaining the suspending means active throughout the range of active travel of the weighing devices for articles of a predetermined weight, and means for discarding articles of other than a predetermined weight.

14. In a weighing machine, a rotatable series of scale beams each provided at one end with means for causing the articles to be weighed to adhere in suspended relation thereto, means for maintaining the suspending means active to articles or predetermined weight throughout the range of active movement of the weighing devices, and means for causing the suspending means to release articles of other than the predetermined weight before the limit of active movement of the weighing devices is reached.

15. In a weighing machine, rockable scale beams, each having an article engaging member at one end with means for causing the article to adhere in suspended or pendent relation thereto, and means for causing the release under predetermined weight conditions of the article so suspended.

16. In a weighing machine, rockable scale beams each having an article engaging member at one end with means for causing the article to adhere in suspended or pendent relation thereto, said scale beam being also provided with means for causing the release of the article by movements of the scale beam.

17. In a weighing machine, a rockable scale beam provided at one end with article engaging means having means for causing the article to adhere in suspended or pendent relation thereto, and means responsive to movements of the scale beam due to the action of an article of less than a predetermined weight for causing the article suspending means to release such light weight article.

18. In a machine for weighing articles, rockable scale beams each provided with an article engaging means at one end having means for causing the article to adhere in suspended or pendent relation thereto, and means on the scale beam responsive to movements of the latter due to the action of an article of greater weight than a predetermined weight for causing the suspending means to release the article.

19. In a machine for weighing articles, a rockable scale beam having article engaging means provided with means for causing the article to adhere in suspended or pendent relation thereto, and means responsive to rocking movements of the scale beam in either direction from a mean position to cause the release of the article carried thereby.

20. In a weighing machine for articles embodying magnetic material, weighing means provided with magnetic means for suspending the article being weighed, and means responsive to predetermined weight conditions for releasing the suspended article.

21. In a machine for weighing articles embodying magnetic material, magnetic means in position to engage the article at a high point thereon to hold it in suspended relation to the weighing means, and means responsive to predetermined weight conditions for causing the release of the suspended article.

22. In a machine for weighing commodities inclosed in cans of magnetic material, weighing means provided with electromagnetic means for holding the cans during the weighing operation, and means for controlling the electromagnetic means to release the cans under predetermined weight conditions.

23. In a machine for weighing commodities inclosed in cans of magnetic material, weighing means provided with electromagnetic means for holding the cans during the weighing operation, said electromagnetic means being positioned on the weighing means to hold the cans in suspended relation to the electromagnetic means, and means associated with the weighing means for causing the release of the suspended cans from the electromagnetic means under predetermined weight conditions.

24. In a weighing machine for weighing articles inclosed in cans of magnetic material, a scale beam having can-engaging means at one end arranged to be moved into overriding relation to the can, and there provided with electromagnetic means for holding the can during the weighing operation, and means for causing the release of the cans from the electromagnetic means under predetermined weight conditions.

25. In a weighing machine, a scale beam having at one end electromagnetic means for suspending the article to be weighed and at the other end provided with circuit controlling means for the electromagnetic means movable into and out of circuit closing position in accordance with the weight of the article.

26. In a weighing machine, a scale beam having electromagnetic means for suspending the article to be weighed and provided with means for setting the scale beam to be balanced by a predetermined weight, and circuit controlling means on the scale beam for the electromagnetic means movable into circuit closing position on the balancing of the scale beam by the weight for which it is set, and movable to circuit breaking position by a different weight from that for which the scale beam is set.

27. In a weighing machine, a scale beam and a support therefor, the scale beam being provided at one end with electromagnetic means for holding the article to be weighed and at the other end with circuit controlling means and the support for the scale beam being provided with circuit controlling means coacting with the first-named circuit controlling means, the scale beam being movable under the action of a predetermined weight to bring the circuit controlling means into circuit closing position and to cause a breaking of the circuit by a movement of the scale beam under the action of another weight than the predetermined weight.

28. A weighing machine provided with a scale beam having electromagnetic suspending means at one end for the article to be weighed and at the other end provided with a circuit terminal connected to the electromagnetic means, and another circuit terminal separate from the scale beam and in the path of the first-named circuit terminal to cause the closure of the circuit and the energization of the electromagnetic means on a movement of the scale beam due to the action of a predetermined weight and the rupture of the circuit on the movement of the scale beam under the action of another than the predetermined weight.

29. In a machine for weighing cans of magnetic material containing commodities, a scale beam provided at one end with electromagnetic means movable into operative relation to the top of an upright can, said scale beam having means for balancing it when carrying a can and its contents of predetermined weight, and circuit controlling means in part carried by the scale beam for maintaining the circuit of the electromagnetic means under the action of a can of the predetermined weight, and for breaking the circuit under the action of a can of a weight other than the predetermined weight.

30. In a weighing machine, a scale beam having means for setting it to balance under the action of a predetermined weight, said scale beam having one end provided with a head portion and a pendent shield to engage a can, an electromagnet carried by the head portion in position to hold a can of magnetic material with its contents in suspended relation to the magnets, and circuit controlling means in part on the scale beam for maintaining the circuit closed when the scale beam is balanced by the can and its contents and causing the opening of the circuit on the movement of the scale beam under the action of a can and its contents of a weight to unbalance the scale beam.

31. In a weighing machine, a scale beam having means for causing it to balance under the action of predetermined weight, means for causing the scale beam to release an article being weighed on a deviation from a predetermined weight, and means for providing for a minimum variation from the predetermined weight without release of the article being weighed.

32. In a weighing machine, a rockable scale beam and a support therefor, electromagnetic means on the scale beam for holding the article to be weighed, circuit controlling means in part on the scale beam and movable therewith to maintain the electromagnetic means active when the scale beam is balanced by a predetermined weight, and to break the circuit under the action of another weight, and means on the support in the path of the scale beam to provide for a minimum variation from the predetermined weight without causing a rupture of the circuit.

33. In a weighing machine, a rockable scale beam and a support therefor, electromagnetic means on one end of the scale beam for engaging and holding the article to be weighed, circuit controlling means on the scale beam participating in the movements thereof to maintain the circuit of the electromagnetic means under certain conditions and to break the circuit under other conditions, and yiledable weights in the path of the scale beam to hold the latter to a predetermined minimum extent to provide for a minimum variation from the predetermined weight without causing rupture of the circuit.

34. In a weighing machine, a rockable scale beam having electromagnetic means at one end for suspending a can of magnetic material with its contents and at the other end provided with circuit controlling means for the electromagnetic means movable with the scale beam into and out of circuit closing position, and means in the path of the scale beam for loading the scale beam in opposition to the action of weights other than that for which the scale beam is initially set to provide for minimum variation from the predetermined weight, said means comprising rockable weight carrying members into engagement with which the scale beam is movable while still maintaining the electric circuit intact.

35. A weighing machine comprising a rotatable member, a series of scale beams mounted thereon for rotation therewith, each scale beam being movable to balanced position under the action of a predetermined weight and provided at one end with electromagnetic means for holding the article to be weighed and at the other end with a circuit terminal for said electromagnetic means, other circuit terminals, one for each scale beam, in the path of the first-named circuit terminals, said circuit terminals being related to close the circuits of the electromagnetic means when the scale beams are balanced, means for feeding tin cans containing commodities into the path of the electromagnetic ends of the scale beams, and means for releasing cans of predetermined weight from the electromagnetic means at the termination of the active travel of the scale beams, the scale beams being movable under the action of cans weighing other than the predetermined amount to break the circuit at an intermediate point in the active travel of the scale beams.

36. In a weighing machine for weighing tin cans containing commodities, a series of scale beams each adjusted to balance under a predetermined weight, each scale beam having at one end a can engaging member carrying an electromagnet arranged to engage the can by magnetic attraction, circuit controlling means for each electromagnet movable into and out of circuit closing relation by movements of the scale beam and closing the circuit in the balanced position of the scale beam, means for presenting cans in position to be engaged by the scale beam, and means for receiving cans from the scale beams, the machine being provided with means for breaking the circuit of the electromagnetic means at a point constituting the termination of the active movement of the scale beams, and said scale beams being movable under weights other than the predetermined weight to break the circuit at an intermediate point in the travel of the scale beam to there discharge the cans.

37. In a weighing machine for tin cans containing commodities, a rotatable circular series of scale beams adjusted to balance under a predetermined weight, each scale beam having at one end electromagnetic means for suspending a can and at the other end being provided with circuit controlling means for the electromagnetic means movable with the scale beam into and out of circuit closing position and adjusted to close the circuit when the scale beam is balanced, means for moving cans into the path of the scale beams, means at another point in the travel of the scale beams for receiving cans discharged from the machine, means at the receiving end of the machine for moving the scale beams into attractive relation to the cans and at the same time closing the circuit, means at the discharge end of the machine for causing the rupture of the circuit to there deënergize the electromagnetic means for the release of the cans.

38. In a weighing machine for tin cans containing commodities, a rotatable circular series of scale beams adjusted to balance under a predetermined weight, each scale beam having at one end electromagnetic means for suspending a can and at the other end being provided with circuit controlling means for the electromagnetic means movable with the scale beam into and out of circuit closing position and adjusted to close the circuit when the scale beam is balanced, means for moving cans into the path of the scale beams, means at another point in the travel of the scale beams for receiving cans discharged from the machine, means at the receiving end of the machine for moving the scale beams into attractive relation to the cans and at the same time closing the circuit, means at the discharge end of the machine for causing the rupture of the circuit to there deënergize the electromagnetic means for the release of the cans, said machine being provided with can receiving means between the receiving and discharge end of the machine, and the scale beams being movable under the action of cans of other weights than the predetermined weights to rupture the electric circuit and discharge such cans within the zone represented by the intermediate can receiving means.

39. In a weighing machine for tin cans containing commodities, a rotatable circular series of scale beams adjusted to balance under a predetermined weight, each scale beam having at one end electromagnetic means for suspending a can and at the other end being provided with circuit controlling means for the electromagnetic means movable with the scale beam into and out of circuit closing position and adjusted to close the circuit when the scale beam is balanced, means for moving cans into the path of the scale beams, means at another point in the travel of the scale beams for receiving cans discharged from the machine, means at the receiving end of the machine for moving the scale beams into attractive relation to the cans and at the same time closing the circuit, means at the discharge end of the machine for causing the rupture of the circuit to there deënergize the electromagnetic means for the release of the cans, said machine being provided with can receiving means between the receiving and discharge end of the machine, and the scale beams being movable under the action of cans of other weights than the predetermined weights to rupture the electric circuit and discharge such cans within the zone represented by the intermediate can receiving means, the scale beams being movable under the action either of light weight or over weight cans to cause the rupture of the circuit and the machine including means for holding the scale beams against movement under over weight cans for the first part of the travel of the scale beams from the feeding to the discharge end of the machine.

40. In a machine for weighing tin cans containing commodities, a rotatable series of rockable scale beams each adjusted to balance for a predetermined weight, each scale beam being provided at one end with can engaging means and with electromagnetic means in position to hold the can in suspended relation thereto and each scale beam having at the other end circuit controlling means for the electromagnetic means and movable out of circuit closing position when displaced from the balanced position, means in the path of the scale beam for establishing a minimum variation from the predetermined weight without deënergization of the electromagnetic means, means for feeding the cans to be weighed to the machine, means for moving the electromagnetic means into attractive relation to the cans at the feeding end of the machine, means active to the scale beams for moving them into circuit breaking position to release the cans at the discharge end of the machine, and receiving means for the cans between the feeding and discharge ends of the machine, the scale beams being movable to circuit breaking position under the action of cans of other than the predetermined weight and the receiving means being located to catch cans so discharged.

41. In a weighing machine for weighing commodities inclosed in tin cans, a rotatable spider, a circular series of rockable scale beams mounted thereon, each scale beam having at its outer end a can engaging shield, and electromagnetic means in position to engage the top of a can, the other end of the scale beam being provided with a circuit terminal connected to the electromagnetic means, other circuit terminals, one for each scale beam, carried by the spider and into and out of contact with which the circuit terminals of the scale beams are movable with the latter, means for moving cans in order into the path of the can engaging ends of the scale beams, means at another point in the path of movement of the scale beams for conveying cans discharged therefrom to a point of disposal, receptacles in underriding relation to the scale beams and located between the receiving and discharge ends of the machine, said scale beams maintaining the circuits of the electromagnetic means in the balanced position and causing the rupture of the circuits when moved to either side of the balanced position, means for rocking the scale beams on approaching the receiving end of the machine to close the circuit and bring the electromagnets into attractive relation to the cans fed to the machine, means at the discharge end of the machine for rocking the scale beams into circuit breaking position to there discharge the cans, and sustaining means for the scale beams leading from the receiving end of the machine part of the way toward the discharge end of the machine for preventing rocking movements of the scale beams under the action of overweight cans.

42. In a weighing machine for weighing commodities inclosed in tin cans, a rotatable spider, a circular series of rockable scale beams mounted thereon, each scale beam having at its outer end a can engaging shield, and electromagnetic means in position to engage the top of a can, the other end of the scale beam being provided with a circuit terminal connected to the electromagnetic means, other circuit terminals, one for each scale beam, carried by the spider and into and out of contact with which the circuit terminals of the scale beams are movable with the latter, means for moving cans in order into the path of the can engaging ends of the scale beams, means at another point in the path of movement of the scale beams for conveying cans discharged therefrom to a point of disposal, receptacles in underriding relation to the scale beams and located between the receiving and discharge ends of the machine, said scale beams maintaining the circuit of the electromagnetic means in the balanced position and causing the rupture of the circuits when moved to either side of the balanced position, means for rocking the scale beams on approaching the receiving end of the machine to close the circuit and bring the electromagnets into attractive relation to the cans fed to the machine, means at the discharge end of the machine for rocking the scale beams into circuit breaking position to there discharge the cans, and sustaining means for the scale beams leading from the receiving end of the machine part of the way toward the discharge end of the machine for preventing rocking movements of the scale beams under the action of over weight cans, the spider being also provided with adjustable and yieldable weight carrying members in the path of each scale beam to interpose a minimum weight for adjusting the scale beams to provide for a minimum variation from the predetermined weight without causing a discard of cans so varying in weight from the predetermined weight.

In testimony, that I claim the foregoing as my own, I have hereto affixed my signature in the presence of two witnesses.

WALTER J. PHELPS.

Witnesses:
JOHN H. SIGGERS,
JOHN R. RAY.